(12) United States Patent
Scott (10) Patent No.: US 7,028,825 B2
(45) Date of Patent: Apr. 18, 2006

(54) CONVEYOR ROLLER ASSEMBLY, CONVEYOR ROLLER INSERT AND AXLE FOR CONVEYOR ROLLER

(76) Inventor: C. Winfield Scott, 8575 Bridgewater La., Cincinnati, OH (US) 45243

( * ) Notice: Subject to any disclaimer, the term of this patent is extended or adjusted under 35 U.S.C. 154(b) by 0 days.

(21) Appl. No.: 10/817,185

(22) Filed: Apr. 2, 2004

(65) Prior Publication Data
US 2005/0217967 A1 Oct. 6, 2005

(51) Int. Cl.
*B65G 13/00* (2006.01)
(52) U.S. Cl. .................. 193/37; 193/35 B
(58) Field of Classification Search ........... 198/780; 193/37, 35 R, 35 B, 35 TE
See application file for complete search history.

(56) References Cited

U.S. PATENT DOCUMENTS

| | | | | |
|---|---|---|---|---|
| 3,353,644 A | * | 11/1967 | McNash et al. | 193/37 |
| 5,080,219 A | * | 1/1992 | Imai et al. | 198/781.06 |
| 5,865,290 A | * | 2/1999 | Scott | 193/37 |
| 5,875,878 A | * | 3/1999 | Pierson | 193/37 |
| 6,161,673 A | * | 12/2000 | Nimmo et al. | 193/37 |
| 6,554,117 B1 | * | 4/2003 | Henson et al. | 193/37 |
| 6,702,091 B1 | * | 3/2004 | Nimmo et al. | 193/37 |
| 6,782,996 B1 | * | 8/2004 | Wolf | 198/781.02 |

* cited by examiner

*Primary Examiner*—Gene O. Crawford
*Assistant Examiner*—Mark A. Deuble
(74) *Attorney, Agent, or Firm*—Dinsmore & Shohl LLP (57) ABSTRACT

A roller insert for a conveyor roller tube including a cartridge having inner and outer ends and configured to be inserted into an end of a conveyor roller tube; a stub axle positioned within the cartridge, the stub axle including an elongate body portion, a cylindrical tip portion extending away from the body portion, and an end cap having distal and proximal ends and a hardness less than that of the tip portion, the end cap threadingly secured on the cylindrical tip portion; and at least one bearing mounted within the cartridge and supporting the axle such that the cartridge is rotatable with respect to the axle and the axle is slidable with respect to the bearing; wherein the axle is biased outwardly from the cartridge such that the end cap projects outwardly from the cartridge outer end. A conveyor roller and an axle for a conveyor roller are also provided.

21 Claims, 7 Drawing Sheets

CONVEYOR ROLLER ASSEMBLY, CONVEYOR ROLLER INSERT AND AXLE FOR CONVEYOR ROLLER

FIELD OF THE INVENTION

The present invention relates to the field of conveyor rollers and, more particularly, to conveyor rollers having stub shafts, conveyor roller inserts for mounting conveyor rollers to a support frames. and conveyor roller axles.

BACKGROUND OF THE INVENTION

Conveyor systems utilizing rollers are widely used in a variety of industrial applications. In a typical configuration, a plurality of closely spaced, freely-rotating conveyor rollers are mounted in parallel to an elongate support frame. The structure for mounting the rollers to the support frame is integral with the rollers. In some conveyor roller designs, inserts are mounted in each end of the roller tube and include protrusions projecting outwardly from the ends of the tube which are received within opposing pairs of mounting holes provided on the conveyor frame. Consequently, each conveyor roller assembly is independently attachable to and removable from the conveyor support frame.

Such a structure is advantageous in terms of flexibility of design and ease of maintenance. However, a disadvantage with such a conveyor rollers is that a loose fit between the protrusions and the mounting holes can enlarge due to wear over time to the point where the protrusions may rotate in their respective mounting holes, resulting in further wear and noise. This is especially true for roller bodies having cylindrical protrusions or for rollers bearing high loads.

In order to avoid this problem, rollers have been designed using non-cylindrical protrusion shapes to prevent their rotation relative to the support frame.

Typically, these protrusions have a polygonal shape in cross section, such as a hexagonal shape. However, other shapes, such as semi-cylindrical, having a flat formed thereon, have been used. For example, U.S. Pat. No. 3,353, 644 to McNash et al. discloses a conveyor roller having protruding hexagonal stub shafts for engaging correspondingly-shaped mounting holes in side rails. However, even when rollers having protrusions with eccentric shapes are used, some wear and noise results during use due to the continual vibration of the conveyor assembly. Furthermore, over time, the edges of the protrusions and the mounting holes or slots can wear to the point where rotation of the protrusion in the hole becomes possible, further adding to the wear on, and early failure of, the rollers. The repair work that is required to maintain these systems, especially when conveyor rollers wear out and fail prematurely, can be quite expensive both in labor and materials and production downtime.

To prevent this occurrence, prior art systems have used protrusions which are spring-biased and tapered so that they fit snugly into the mounting holes or slots of the conveyor frame. An example of such a configuration is shown in U.S. Pat. No. 5,421,442 to Agnoff, which discloses a conveyor roller having a central hollow shaft extending therethrough, in either side of which is mounted a spring-biased shuttle having a tapered, hex-shaped tip.

Should only one of a pair of protrusions fail, in order to minimize the maintenance expense associated with conveyor repair it is desirable to replace only that component of the roller mounting mechanism. However, with prior art rollers in which the mounting components are integral, the entire roller may have to be discarded despite the failure of only one mounting component.

SUMMARY OF THE INVENTION

One embodiment of the present invention provides a conveyor roller insert for a conveyor roller tube having:

(a) a cartridge having inner and outer ends and configured to be inserted into an end of a conveyor roller tube;

(b) a stub axle positioned within the cartridge, the stub axle including an elongate body portion, a cylindrical tip portion extending away from the body portion, and an end cap having distal and proximal ends and a hardness less than that of the tip portion, the end cap threadingly secured on the cylindrical tip portion; and (c) at least one bearing mounted within the cartridge and supporting the axle such that the cartridge is rotatable with respect to the axle and the axle is slidable with respect to the bearing;

wherein the axle is biased outwardly from the cartridge such that the end cap projects outwardly from the cartridge outer end.

The roller insert may further include an annular shoulder located between the body portion and the tip portion, and the end cap may be threadingly secured to the tip portion such that such that the proximal end of the end cap engages the shoulder. In some embodiments, the end cap is hollow and is configured to receive the tip portion in the interior of the end cap. For example, the cylindrical tip portion of the axle may included an outer end surface and a threaded bore extending from the outer end surface towards the body portion, The interior of the end cap may include a threaded shaft extending from the distal end of the end cap such that the end cap may be secured on the tip portion by threading engagement of the threaded shaft and the threaded bore.

The end cap may be formed (e.g., molded) from a polymeric material, such as an elastomer (e.g., polyurethane) or a thermoplastic (e.g., polypropylene or nylon). In addition, the cross-sectional shape of the end cap may be polygonal (e.g., hexagonal), circular, semi-circular, or any other desired shape. Also, the end cap may even be tapered along at least a portion of its length.

The roller insert according to embodiments of the present invention may also include a pair of bearings mounted within the cartridge and supporting the axle such that the cartridge is rotatable with respect to the axle and the axle is slidable with respect to the bearings. A bushing may also be mounted within the first (or outer) bearing. The bushing may include a central bore which such that the elongate body portion of the axle is slidingly positioned within the central bore of the bushing. The bushing may also have a groove extending about its outer circumference, such that the inner race of the outer bearing may be positioned at least partially within the groove. In addition, the bushing may include a plurality of flexible fingers at its proximal end, with each of the fingers having a proximal end surface. The axle may then include a flange positioned such that the flange is biased against the proximal end surfaces of the fingers, whereby the fingers are urged outwardly so as to retain the bushing in place.

The roller insert may also have a coil spring for biasing the axle. The axle may include a rod portion extending away from the proximal end of the elongate body portion, with the flange located between the elongate body portion and the rod portion and the coil spring extending about the rod portion and seated against the flange. When a second (or inner)

bearing is included, one end of the coil spring may be seated against the flange and the other end of the coil spring seated against the second bearing.

The present invention also provides a conveyor roller having an elongate roller tube and a roller insert inserted into each end of the roller tube.

The present invention further provides an axle for use in a conveyor roller, wherein the axle comprises:

(a) an elongate body portion;

(b) at least one cylindrical tip portion extending away from the body portion;

(c) an annular shoulder located between the body portion and the tip portion;

(d) a hollow end cap having distal and proximal ends and a hardness less than that of the tip portion, the end cap threadingly secured on the cylindrical tip portion such that the proximal end of the end cap engages the shoulder.

The axle may be a stub axle or even a through axle. In the case of a through axle for a conveyor roller, a cylindrical tip portion and end cap may be provided on each end of the axle.

BRIEF DESCRIPTION OF THE DRAWINGS

The following detailed description will be more fully understood in view of the drawings in which.

The embodiments set forth in the drawings are illustrative in nature and are not intended to be limiting of the invention defined by the claims. Moreover, individual features of the drawings and the invention will be more fully apparent and understood in view of the detailed description.

DETAILED DESCRIPTION

The present invention is directed to a conveyor roller assembly, a conveyor roller insert for a conveyor roller tube, as well as an axle for use in a conveyor roller. In particular embodiments, the outer end portion of the axle (i.e., the portion of the axle which engages the mounting hole in a conveyor frame) is replaceable and may have a surface hardness which is less than that of the inner portion of the axle.

For example, a removable end cap made from a polymeric material (e.g., an elastomer such as polyurethane or a thermoplastic such as polypropylene or nylon) is secured on an outer tip portion of a metal axle. Since this polymeric end cap is positioned within the mounting hole of the conveyor frame rather than the metal portion of the axle, embodiments of the present invention result in significant reduction in vibration and noise, as well as reduced wear of the mounting holes of the conveyor frame. In addition, since the end cap may be easily replaceable, embodiments of the present invention also increase the useful life of conveyor rollers, particularly the axle portion. Thus, rather than replacing the axle or even the entire roller when the tip of the axle becomes worn, the conveyor roller can be "refurbished" simply by replacing the end cap, thus resulting in considerable savings.

An additional feature of embodiments of the present invention is that the end cap may be provided in various shapes and sizes. For example, the end cap may be tapered or straight along its length. By way of further example, the end cap may have various cross-sectional shapes, such as polygonal (e.g., hexagonal), circular, or even semi-circular (e.g., having one or more flat portions). This provides additional flexibility since the configuration of the outer end portion of an axle may be modified simply by replacement of the end cap rather than installing a new axle on a conveyor roller.

Figure 1:
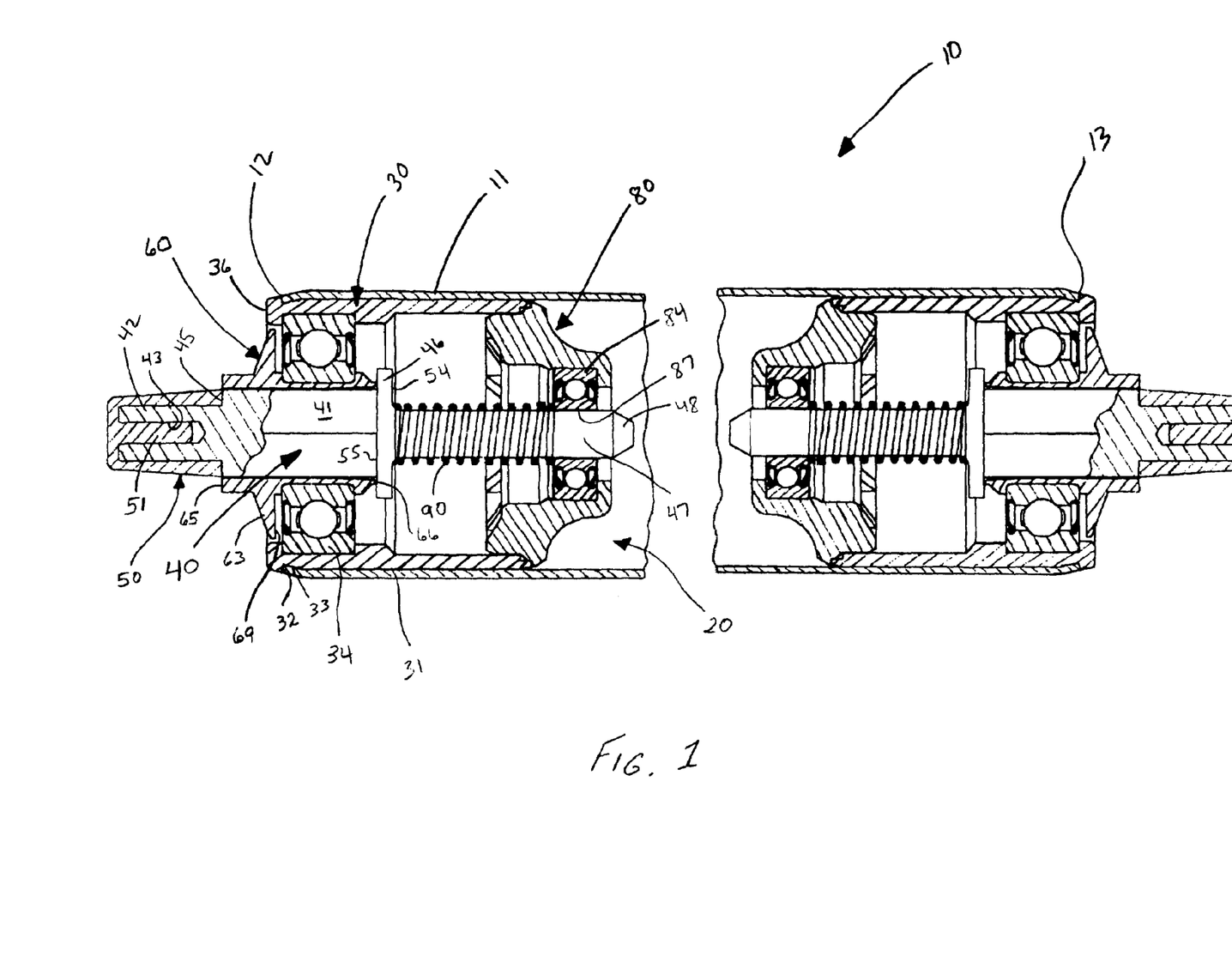
FIG. 1 is a cross-sectional view of a conveyor roller assembly according to one embodiment of the present invention, wherein the axles are shown in partial cross-section and the center portion of the conveyor roller tube has been omitted.

FIG. 1 depicts a cross-sectional view of an exemplary embodiment of a conveyor roller assembly 10 according to the present invention. Conveyor roller 10 generally includes a conveyor roller tube 11 having first and second open end portions 12 and 13. Conveyor roller tube 11 may be a straight cylinder as shown, or may even comprise a tapered cylinder, as is known to those skilled in the art. Conveyor roller inserts 20 having stub axles 40 rotatably mounted therein are secured within the first and second end portions of conveyor roller tube 11 such that conveyor roller tube 11 is rotatable relative to stub axles 40. As further described herein, stub axles 40 are also axially moveable with respect to conveyor roller tube 11 such that the outer end portion of stub axle 40 may be depressed inwardly (i.e., into the end portion of roller tube 11) for installation of the conveyor roller in a frame.

In the embodiment of FIG. 1, conveyor roller insert 20 includes a tubular cartridge 30 shaped to be fitted into the open end portions 12 and 13 of conveyor roller tube 11. Cartridge 30 includes a generally cylindrical sidewall 31, and inner and outer ends 37 and 36, respectively (see FIGS. 1 and 3). Outer end 36 includes a lip 32 formed thereon which is configured to engage and cover the end wall of conveyor roller tube 11. In this manner, cartridge 30 may be press fit into the open end portions of conveyor roller tube 11.

Figure 3:
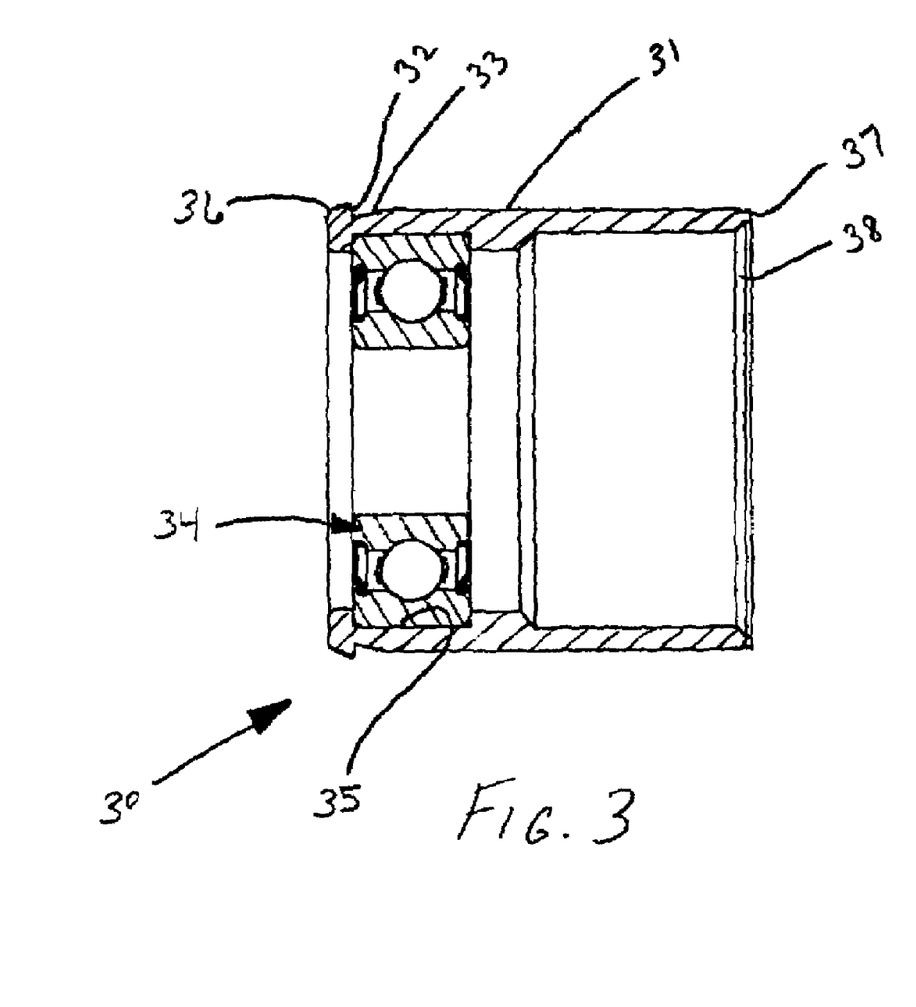
FIG. 3 is a cross-sectional view of a cartridge used in the conveyor roller insert of the embodiment shown in FIG. 1.

In the embodiment shown in FIGS. 1 and 3, sidewall 31 tapers inwardly adjacent lip 32 such that the open end portion of tube 11 may be crimped into the tapered groove formed by lip 32 and tapered portion 33 of sidewall 31, as shown in FIG. 1. As best seen in the cross-sectional view of FIG. 3, cartridge 30 may also include a sloped shoulder 38 extending about the interior periphery adjacent inner end 37. As further described herein, sloped shoulder 38 facilitates the attachment of a bearing retainer member 80 to the inner end 37 of cartridge 30.

As best seen in FIG. 3, cartridge 30 further includes a bearing 34 having inner and outer races and a ring of balls captured therebetween. The outer race of bearing 34 is seated and captured within a groove 35 formed in the interior of sidewall 31 of cartridge 30 adjacent outer end 36. Since cartridge 30 may be made from a polymeric material, particularly an electrically conductive thermoplastic (such as electrically conductive polypropylene), cartridge 30 may be molded around bearing 34 in order to encapsulate and retain bearing 34 within cartridge 30.

As best seen in FIG. 1, stub axle 40 extends through the central passageway formed by the inner race of bearing 34 such that bearing 34 supports stub axle 40 and allows for the rotation of cartridge 30 with respect to axle 40. In the embodiment shown in FIG. 1, however, a bushing 60 is provided between stub axle 40 and bearing 34, as further described herein.

Figure 2:
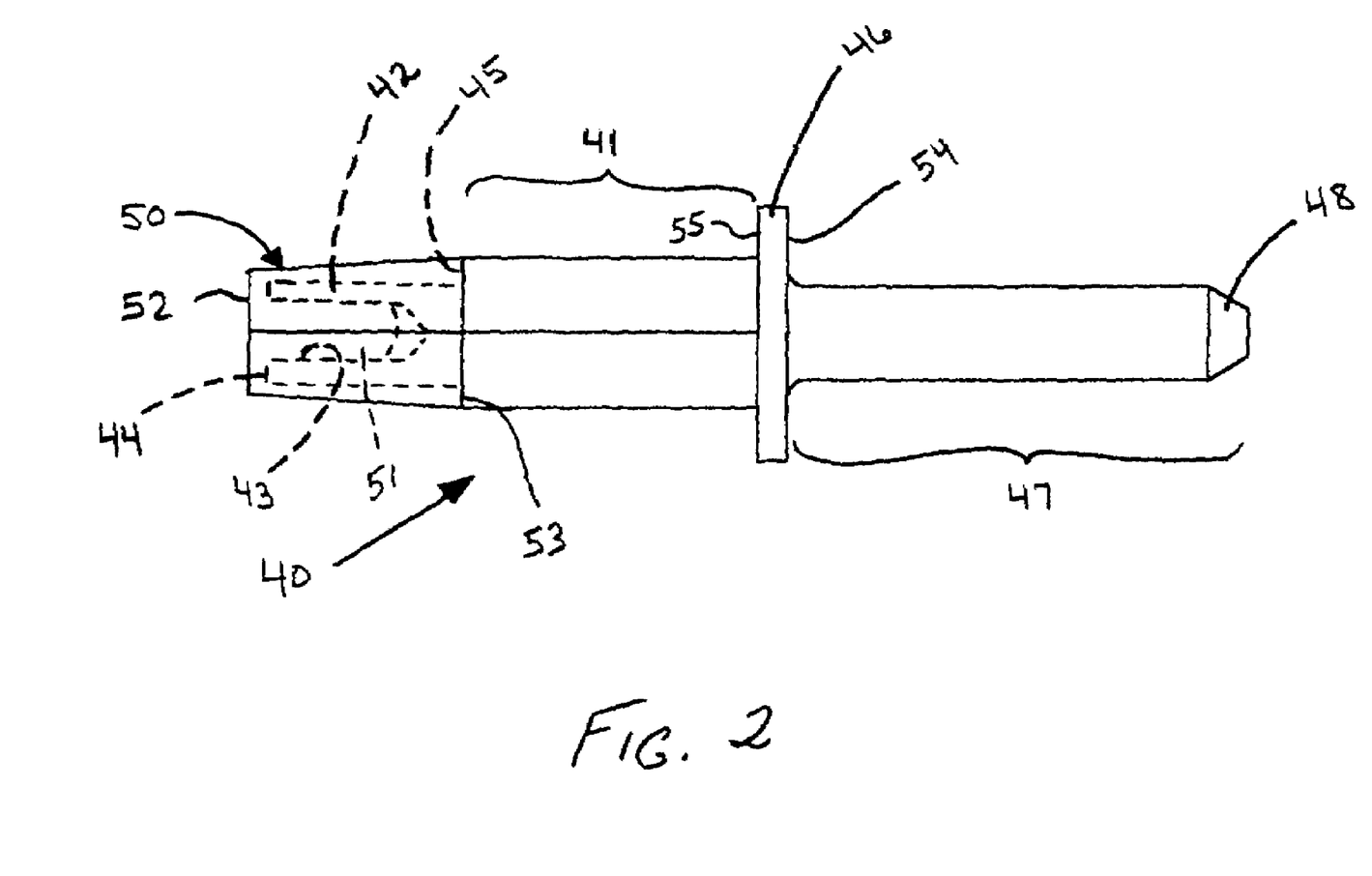
FIG. 2 is a side view of a stub axle according to an embodiment of the present invention.

An axle according to one embodiment of the present invention is depicted in FIG. 2, specifically, a stub axle 40. It should be noted, however, that the present invention is not limited to stub axles for conveyor rollers, as further described herein. In the embodiment of FIG. 2, stub axle 40 includes an elongate body portion 41 and a cylindrical tip portion 42 extending outwardly away from body portion 41. Since the diameter of cylindrical tip portion 42 is smaller than the diameter of elongate body portion 41 (at least where tip portion 42 meets body portion 41), an annular shoulder 45 is located between body portion 41 and tip portion 42. In the embodiment shown in FIG. 2, elongate body portion 41 has a hexagonal cross-sectional shape. Therefore, the outer circumference of shoulder 45 in FIG. 2 is hexagonal while the inner circumference is circular.

As also seen in FIGS. 1 and 2, stub axle 40 includes a hollow end cap 50 removeably secured on cylindrical tip portion 42. End cap 50 is sized and configured to be received within the mounting hole of a conveyor frame. In particular, end cap 50 may be sized and configured such that the end cap is the only portion of axle 40 which is positioned within the mounting hole of the conveyor frame. In this manner, only replaceable end cap 50 will be subject to wear during use, thus allowing the user to simply replace end cap 50, as needed, rather than replacing the entire axle or conveyor roller due to wear.

The outer surface of end cap 50 may also have a hardness which is less than that of cylindrical tip portion 42. By way of example, end cap 50 may be made from a polymeric material such as an elastomer or a thermoplastic, while elongate body portion 41 and cylindrical tip portion 42 are integrally formed from a metal (such as steel) or other material which is more rigid than end cap 50. In a particular embodiment, end cap 50 is formed from an electrically conductive polymeric materials, such as electrically conductive polyurethane. Because of the reduced hardness of end cap 50, a conveyor roller employing such an axle will provide reduced noise and vibration during use. At the same time, cylindrical tip portion 42 will ensure that the outer end portion of the axle retains sufficient rigidity and strength.

End cap 50 may be removeably secured on cylindrical tip portion 42 in a variety of manners, such as by threading engagement. In the embodiment shown in FIGS. 1 and 2, for example, cylindrical tip portion 42 includes a threaded axial bore 43 which extends inwardly from outer end surface 44 towards body portion 41. The hollow interior of end cap 50 is cylindrical and is sized to fit over cylindrical tip portion 42. The interior of end cap 50 also includes a threaded shaft 51 extending from distal end 52 of end cap 50, thus providing an annular cross-sectional shape for at least a portion of the interior of end cap 50.

Threaded shaft 51 is sized and configured to threadingly engage the threaded bore 43 in cylindrical tip portion 42. In this manner, shaft 51 may be rotatingly inserted into bore 43 in order to threadingly secure end cap 50 on cylindrical tip portion 42, with proximal end surface 53 of end cap 50 engaging shoulder 45.

In the embodiment shown in FIG. 2, the outer surface of end cap 50 tapers inwardly such that the diameter of end cap 50 at distal end 52 is smaller than the diameter at proximal end 53. In addition, the diameter of end cap 50 at proximal end 53 corresponds to the outer diameter of elongate body portion 41 at shoulder 45, thereby providing a smooth transition between end cap 50 and body portion 41. Also in the embodiment of FIG. 2, end cap 50 has a hexagonal cross-sectional shape. Since elongate body portion 41 also has a hexagonal cross-sectional shape, end cap 50 and tip portion 42 may further be configured such that when shaft 51 of end cap 50 is threaded into bore 43 and tightened, the flats on the outer surface of end cap 50 will be aligned with the flats on the outer surface of elongate body portion 41.

Figure 8:
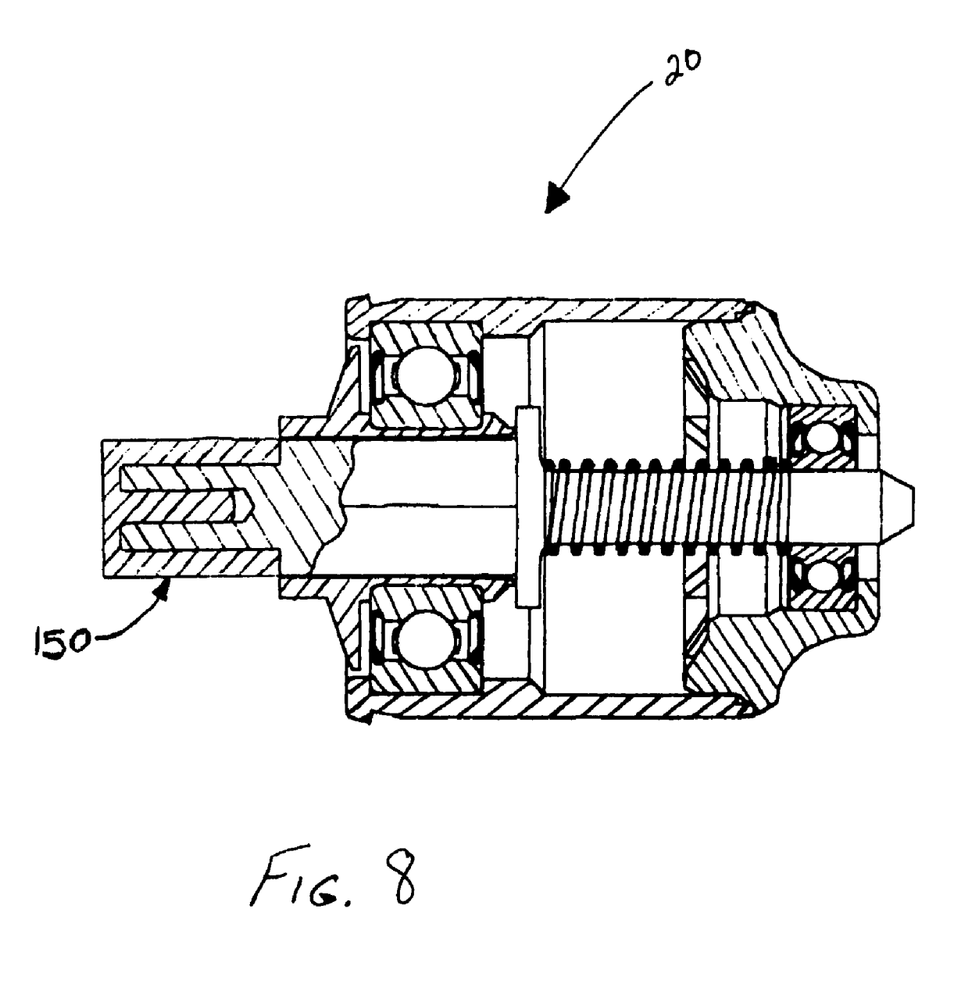
FIG. 8 is a cross-sectional view of a conveyor roller insert according to another embodiment of the present invention, wherein the axle is shown in partial cross-section.

Of course end cap 50 may be provided in a variety of shapes and sizes. For example, in the embodiment of FIG. 8, end cap 150 has a straight cylindrical shape rather than tapered. The remaining portions of roller insert 20 in FIG. 8, are identical to that shown in FIG. 1. Thus, conveyor rollers having non-tapered tips may be readily provided simply by replacing the end cap. Likewise, the end cap may be provided in a circular as well as other cross-sectional shapes besides hexagonal. In this manner, the same conveyor roller or conveyor roller insert may be used in a wide variety of applications simply by selection of the proper end cap. In fact, an end user requiring multiple conveyor roller configurations may simply stock the conveyor roller depicted in FIG. 1 and two or more styles of end caps (e.g., straight and tapered) in order to accommodate its needs.

Figure 5:
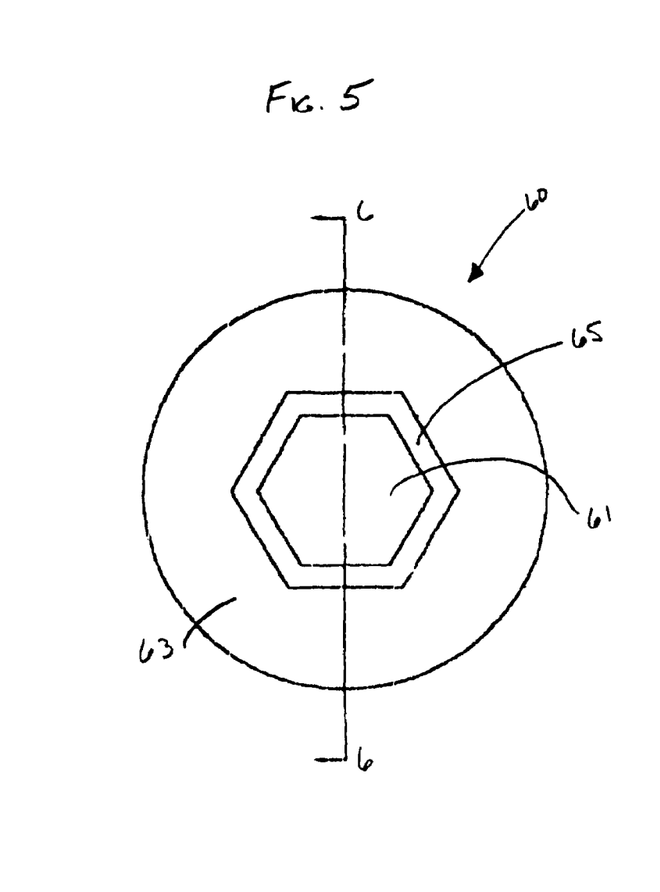
FIG. 5 is an outer end view of a bushing used in the conveyor roller insert of the embodiment shown in FIG. 1.
Figure 6:
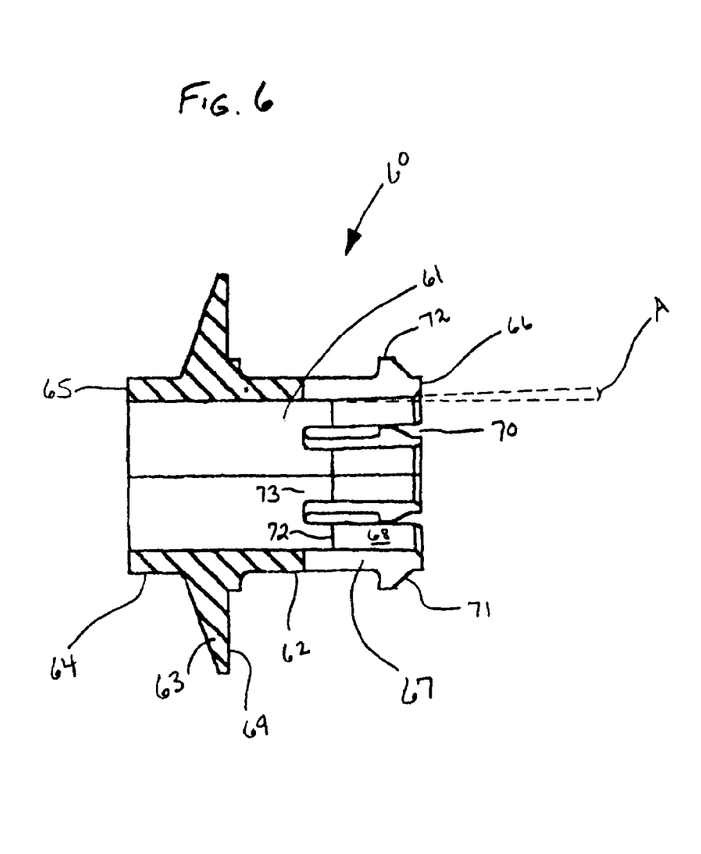
FIG. 6 is a cross-sectional view of the bushing shown in FIG. 5, taken along the line 6—6 thereof.

As mentioned previously, a bushing 60 may be positioned within bearing 54, as seen in FIG. 1. As shown in FIGS. 5 and 6, bushing 60 includes a central bore 61 which is shaped to slidably receive elongate body portion 41 of stub axle 40 therethrough. Thus, in the embodiment shown, central bore 60 has a hexagonal cross-sectional shape corresponding to that of body portion 41 of axle 40. In this manner, elongate body portion 41 of axle 40 may be positioned within central bore 61 of bushing 60 such that axle 40 is not capable of rotation with respect to bushing 60. However, axle 40 will be rotatable, along with bushing 60, with respect to cartridge 30 and conveyor roller tube 11.

Bushing 60 also includes a circumferential groove 62 extending about its outer surface, wherein groove 62 is sized and configured such that the inner race of bearing 34 may be at least partially positioned within the groove 62 (see FIG. 1). When positioned in this manner, the inner race of bearing 34 will essentially be attached to bushing 60 such that cartridge 30 is rotatable with respect to bushing 60.

Bushing 60 may further include a flange 63 located distally with respect to groove 62. Flange 63 is configured to cover and protect bearing 34, and may have an outer diameter slightly less than the inner diameter of outer end 36 of cartridge 30. In this manner, flange 63 will not interfere with the rotation of cartridge 30 with respect to bushing 60 and axle 40. In addition, as best seen in FIG. 6, flange 63 may be slightly spaced distally (i.e., axially to the left in FIG. 6) from groove 62 such that, when bushing 60 is installed as shown in FIG. 1, a slight gap will exist between inner surface 69 of flange 63 and bearing 34. As also seen in FIG. 6, bushing 60 may further include an extension 64 located between distal end surface 65 and flange 63. Extension 64 will provide additional support for axle 40, and its outer surface may have a hexagonal cross-sectional shape corresponding to the hexagonal shape of central bore 61.

Figure 7:
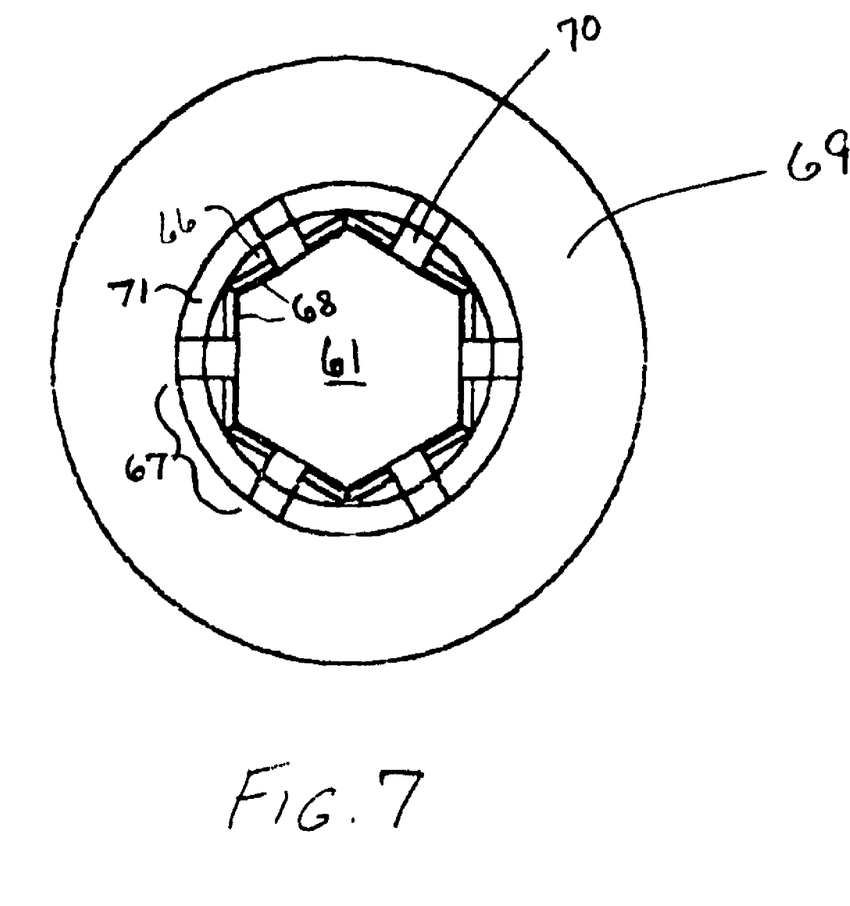
FIG. 7 is an inner end view of the bushing of FIGS. 5 and 6.

At its proximal end, bushing 60 is slotted such that a plurality of fingers 67 are provided. In particular, as best seen in FIGS. 6 and 7, a plurality of grooves 70 extend from proximal end 66 of bushing 60 in the axial direction. With respect to hexagonal central bore 61, grooves 70 are located on the flat portion of the hexagonal cross-section. In this manner, six fingers 67 are provided. When viewed in cross-section, the outer surface of each finger 67 will comprise a circular segment. The cross-sectional shape of the inner surface 68 of each finger 67 will be angular in nature, as best seen in the end view of FIG. 7.

In the embodiment shown in FIGS. 5–7, grooves 70 extend beyond the midpoint of outer circumferential groove 62. In addition, at least a portion of the inner surface 68 of fingers 67 taper outwardly, as indicated by angle A in FIG. 6. In the embodiment shown, inner surface 68 is not tapered along the entire length of each finger 67. In particular, inner surface 68 of finger 67, when viewed in the axial cross-section of FIG. 6, tapers outwardly from a line 72 spaced away from the base 73 of finger 67. In this manner, each finger 67 is cantilevered from line 72. In other words, each finger 67 includes a base portion having a non-tapered inner surface, and a cantilevered portion having a tapered inner surface.

Because the inner surface 68 of fingers 67 taper outwardly, a force applied axially against proximal end surface 66 of bushing 60 will cause fingers 67 to flex outwardly. For example, and as further described herein, axle 40 may include a flange 46 positioned such that flange 46 is biased against proximal end surface 66 of bushing 60. As fingers 67 of bushing 60 are urged outwardly, projections 72 which define the proximal end wall of groove 62 on bushing 60 will prevent bushing 60 from being forced out of roller insert 20. As also seen in FIG. 6, the proximal end wall 71 of projections 72 may be tapered in order to facilitate the insertion of bushing 60 into roller insert 20.

Figure 4:
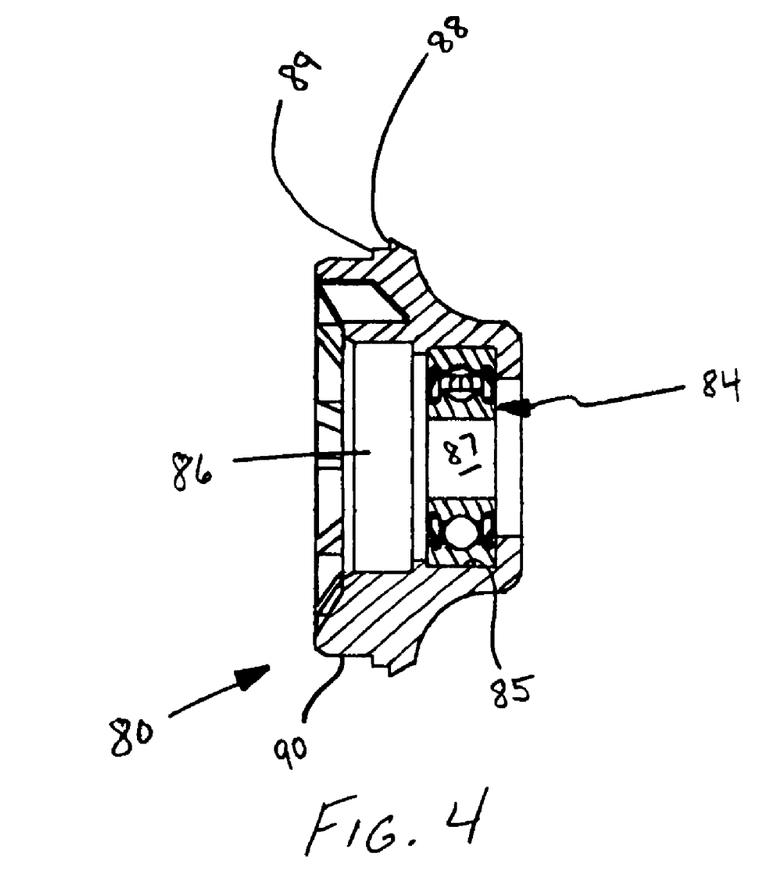
FIG. 4 is a cross-sectional view of a bearing retainer assembly used in the conveyor roller insert of the embodiment shown in FIG. 1.

In the embodiment shown in FIG. 1, each roller insert may further include a second bearing 84 for further rotationally supporting axle 40 with respect to conveyor roller tube 11. In particular, and as best seen in FIG. 4, second bearing 84 is provided in a bearing retainer assembly 80.

Bearing retainer assembly 80 is generally tubular in nature, and includes a central passageway 86. The outer race of bearing 84 is seated and captured within a groove 85 formed in the interior side wall of bearing retainer member 80, as shown in FIG. 4. Like cartridge 30, bearing retainer assembly 80 may be made from a polymeric material, particularly an electrically conductive thermoplastic such as electrically conductive polypropylene. Therefore, bearing retainer assembly 80 may be molded around bearing 84 in order to encapsulate and retain bearing 84 therein. The inner race of bearing 84 defines a central passageway 87 which is sized and configured to slidingly receive and support a rod portion 47 provided an axle 40, as further described herein.

On its outer surface, bearing retainer assembly 80 includes an outer lip 88 extending about the outer circumference of bearing retaining assembly 80. Outer lip 88 is sized and configured such that bearing retainer assembly 80 may be inserted into the inner end portion of cartridge 30 with lip 88 seated against inner end wall 37 of cartridge 30. A shoulder 89 is also provided, and is spaced distally from lip 88. When bearing retainer assembly 80 is inserted into the inner end portion of cartridge 30, shoulder 89 will abut against sloped shoulder 38 on cartridge 30. This configuration will facilitate the welding (such as by sonic welding) of bearing retainer assembly 80 to the inner end portion of cartridge 30. Furthermore, bearing retainer assembly 80 includes a distal end portion 90 having a cylindrical outer surface. Distal end portion 90 is sized and configured to be snugly received into the inner end portion of cartridge 30, as shown in FIG. 1. It should also be noted that the outer circumference of bearing retainer assembly 80 at lip 88 may be equal to or slightly less than the outer circumference of cartridge 30 at inner end wall 37.

As further seen in FIG. 2, stub axle 40 may include a rod portion 47 extending away from elongate body portion 41 at the proximal end thereof. The proximal or inner end 48 of rod portion 47 may also be tapered as shown in order to facilitate insertion of rod portion 47 into central passageway 87 formed by the inner race of second bearing 84. Rod portion 47 is sized and configured to be slidably received in central passageway 87. In this manner, the inner race of second bearing 84 will support rod portion 47 while still allowing slidable movement of the axle relative to both first bearing 34 and second bearing 84. Second bearing 84 will also facilitate rotational movement of cartridge 30 relative to axle 40.

As mentioned previously, axle 40 may be biased outwardly from cartridge 30 such that the outer end portion of the axle will project outwardly from outer end 36 of cartridge 30. However, the outer end portion of the axle can be urged inwardly in order to facilitate insertion of the outer end portion of the axle into a mounting hole on a conveyor frame.

In the embodiment shown, axle 40 further includes a flange 46 located between elongate body portion 41 and rod portion 47. In the embodiment shown, flange 46 may be any of a variety of shapes. However, the outer diameter of flange 46 should be greater than the outer diameter of bushing 60 at proximal end surface 66. In the exemplary embodiment shown, flange 46 has a circular cross-sectional shape.

As best seen in FIG. 1, flange 46, specifically the proximal or inner surface 54 of flange 46, provides a seat for a biasing member, such as a coil spring 90. Coil spring 90 encircles rod portion 47 of axle 40, and is seated against the inner race of second bearing 84. In this manner, coil spring 90 will bias axle 40 outwardly (i.e., in the distal direction). Outer or distal end surface 55 of flange 46 is urged against proximal end surface 66 of bushing 60 by coil spring 90. Thus, bushing 60 acts as a limit or stop, preventing the outward travel of axle 40 from cartridge 30 beyond a preselected distance. At the same time, flange 46 will cause fingers 67 of busing 60 to flex outwardly, thereby preventing bushing 60 from being forced out of cartridge 30.

In the embodiment shown in FIG. 1, the conveyor roller insert 20 is configured such that axle 40 is biased outwardly to the extent that shoulder 45 is normally approximately aligned with distal end surface 65 of bushing 60. In this manner, only end cap 50 of axle 40 is exposed. The outer end portion of axle 40 (end cap 50 and tip portion 42) may be urged inwardly into bushing 60. When mounted in a conveyor frame, bushing 60 will not enter the mounting hole on the frame. Therefore, the outer end portion of axle 40 need not be urged inwardly beyond distal end surface 65 of bushing 60.

All of the components of conveyor roller insert 20 may be made from electrically conductive materials. For example, axle 40, other than end cap 50, may be made from a metal such as steel. As mentioned previously, end cap 50 may be made from an electrically conductive polymeric material such as electrically conductive polyurethane. Cartridge 30, bushing 60 and bearing retainer assembly 80 may also be made from an electrically conductive polymeric material. These three components, however, may generally be made from a more rigid material than end cap 50, such as an electrically conductive thermoplastic (e.g., electrically conductive, glass-reinforced polypropylene). Of course any of a variety of other materials may be used for each of these components.

As also indicated previously, the axle and removable end cap configuration of the present invention may also be used in conjunction with conveyor rollers having through axles (i.e., a single axle which extends through the entire length of the conveyor roller tube). For example, the outer end portions of the axle depicted in U.S. Pat. No. 4,311,226 (which is incorporated herein by way of reference) could be configured in the same manner as the outer end portion of stub axle 40 shown in FIG. 2. As is also known to those skilled in the art, such through shafts may even be spring biased in one or both axial directions.

The specific illustrations and embodiments described herein are exemplary only in nature and are not intended to be limiting of the invention defined by the claims. Further embodiments and examples will be apparent to one of ordinary skill in the art in view of this specification and are within the scope of the claimed invention.

I claim:

1. A roller insert for a conveyor roller tube, comprising:
    (a) a cartridge having inner and outer ends and configured to be inserted into an end of a conveyor roller tube;
    (b) a stub axle positioned within said cartridge, said stub axle including an elongate body portion, a cylindrical tip portion extending away from said body portion, said cylindrical tip portion having an outer end surface and a threaded bore extending from said outer end surface towards said body portion, and a hollow end cap having distal and proximal ends and a hardness less than that of said tip portion, the interior of the end cap including a threaded shaft extending from the distal end of the end cap, said end cap threadingly secured on said cylindrical tip portion by threading engagement of said threaded shaft and said threaded bore; and
    (c) at least one bearing mounted within said cartridge and supporting said axle such that said cartridge is rotatable with respect to said axle and said axle is slidable with respect to said bearing;
    wherein said axle is biased outwardly from said cartridge such that said end cap projects outwardly from said cartridge outer end.

2. The roller insert of claim 1, wherein said axle further includes an annular shoulder located between said body portion and said tip portion, and said end cap is threadingly secured to said tip portion such that such that the proximal end of the end cap engages said shoulder.

3. The roller insert of claim 2, further comprising a bushing mounted within said bearing, said bushing having a central bore which, wherein said elongate body portion of the axle is slidingly positioned within said central bore of said bushing.

4. The roller insert of claim 3, wherein said bushing further includes an outer circumference and a groove extending about said outer circumference, and said bearing has an inner race and an outer race, wherein the inner race of said at least one bearing is positioned at least partially within said groove.

5. The roller insert of claim 4, wherein said bushing includes a plurality of flexible fingers at its proximal end, each of said fingers having a proximal end surface, and further wherein said axle includes a flange positioned such that said flange is biased against the proximal end surfaces of said fingers, whereby said fingers are urged outwardly so as to retain said bushing in place.

6. The roller insert of claim 5, further comprising a coil spring for biasing said axle, and wherein said axle further includes a rod portion extending away from the proximal end of said elongate body portion, with said flange located between said elongate body portion and said rod portion and said coil spring extending about said rod portion and seated against said flange.

7. The roller insert of claim 5, further comprising a second bearing mounted within said cartridge, said second bearing slidably supporting said rod portion of the axle, wherein one end of said coil spring is seated against said flange and the other end of said coil spring is seated against said second bearing.

8. The roller insert of claim 7, wherein said end cap comprises an electrically conductive polymeric material, the cross-sectional shape of said end cap is hexagonal, the cross-sectional shape of said elongate body member of the axle is hexagonal, the diameter of the proximal end of said end cap corresponds to the diameter of said elongate body portion, and said end cap is threadingly secured to said tip portion such that such that the hexagonal shape of the end cap is aligned with the hexagonal shape of said elongate body portion.

9. The roller insert of claim 1, wherein said end cap comprises a polymeric material.

10. The roller insert of claim 1, wherein the cross-sectional shape of said end cap is hexagonal.

11. The roller insert of claim 1, wherein said end cap is tapered along at least a portion of its length.

12. The roller insert of claim 1, comprising a pair of bearings mounted within said cartridge and supporting said axle such that said cartridge is rotatable with respect to said axle and said axle is slidable with respect to said bearings.

13. A conveyor roller, comprising an elongate roller tube and a roller insert inserted into each end of said roller tube, each of said roller inserts comprising:
    (a) a cartridge having inner and outer ends and configured to be inserted into an end of a conveyor roller tube;
    (b) a stub axle positioned within said cartridge, said stub axle including an elongate body portion, a cylindrical tip portion extending away from said body portion, said cylindrical tip portion having an outer end surface and a threaded bore extending from said outer end surface towards said body portion, and a hollow end cap having distal and proximal ends and a hardness less than that of said tip portion, the interior of the end cap including a threaded shaft extending from the distal end of the end cap, said end cap threadingly secured on said cylindrical tip portion by threading engagement of said threaded shaft and said threaded bore; and
    (c) at least one bearing mounted within said cartridge and supporting said axle such that said cartridge is rotatable with respect to said axle and said axle is slidable with respect to said bearing;
    wherein each of said axles is biased outwardly from its corresponding cartridge such that said end cap projects outwardly from said cartridge outer end.

14. The conveyor roller of claim 13, wherein each of said axles further includes an annular shoulder located between said body portion and said tip portion, and said end cap is threadingly secured to said tip portion such that such that the proximal end of the end cap engages said shoulder.

15. The conveyor roller of claim 14, wherein each of said end caps comprises a polymeric material, and the cross-sectional shape of said end caps is hexagonal.

16. An axle for use in a conveyor roller, said axle comprising:
(a) an elongate body portion;
(b) at least one cylindrical tip portion extending away from said body portion, said cylindrical tip portion having an outer end surface and a threaded bore extending from said outer end surface towards said body portion;
(c) an annular shoulder located between said body portion and said tip portion;
(d) a hollow end cap having distal and proximal ends and a hardness less than that of said tip portion, the interior of the end cap including a threaded shaft extending from the distal end of the end cap, said end cap threadingly secured on said cylindrical tip portion by threading engagement of said threaded shaft and said threaded bore such that the proximal end of the end cap engages said shoulder.

17. The axle of claim 16, wherein said axle comprises a stub axle.

18. The axle of claim 16, wherein said end cap comprises a polymeric material.

19. The axle of claim 16, wherein said end cap comprises an elastomer.

20. The axle of claim 16, wherein the cross-sectional shape of said end cap is hexagonal.

21. The axle of claim 16, wherein said end cap is tapered along at least a portion of its length.

* * * * *